(12) United States Patent
Blaney et al.

(10) Patent No.: US 10,557,368 B2
(45) Date of Patent: Feb. 11, 2020

(54) GAS TURBINE ENGINE RAPID RESPONSE CLEARANCE CONTROL SYSTEM WITH VARIABLE VOLUME TURBINE CASE

(71) Applicant: United Technologies Corporation, Hartford, CT (US)

(72) Inventors: Ken F. Blaney, Middleton, NH (US); Todd M. LaPierre, Middleton, NH (US)

(73) Assignee: United Technologies Corporation, Farmington, CT (US)

( * ) Notice: Subject to any disclaimer, the term of this patent is extended or adjusted under 35 U.S.C. 154(b) by 1068 days.

(21) Appl. No.: 14/781,179

(22) PCT Filed: Feb. 6, 2014

(86) PCT No.: PCT/US2014/015080
§ 371 (c)(1),
(2) Date: Sep. 29, 2015

(87) PCT Pub. No.: WO2014/018603
PCT Pub. Date: Nov. 20, 2014

(65) Prior Publication Data
US 2016/0305269 A1    Oct. 20, 2016

Related U.S. Application Data

(60) Provisional application No. 61/811,506, filed on Apr. 12, 2013.

(51) Int. Cl.
*F01D 11/22* (2006.01)
*F01D 25/24* (2006.01)
*F02C 7/28* (2006.01)

(52) U.S. Cl.
CPC .............. *F01D 11/22* (2013.01); *F01D 25/24* (2013.01); *F02C 7/28* (2013.01); *F05D 2220/32* (2013.01);
(Continued)

(58) Field of Classification Search
CPC .......... F01D 11/22; F01D 11/20; F01D 11/16; F01D 11/14; F01D 11/122; F01D 11/08
(Continued)

(56) References Cited

U.S. PATENT DOCUMENTS 4,230,436 A * 10/1980 Davison ................. F01D 11/24
                                                                  415/1
4,334,822 A    6/1982 Rossmann
(Continued)

FOREIGN PATENT DOCUMENTS

CN            202810959          3/2013

OTHER PUBLICATIONS

Extended EP Search Report dated Apr. 22, 2016.

*Primary Examiner* — Carlos A Rivera
*Assistant Examiner* — Jason Mikus
(74) *Attorney, Agent, or Firm* — Getz Balich LLC (57) ABSTRACT

An active clearance control system of a gas turbine engine includes a radially adjustable blade outer air seal system movable between a radially contracted Blade Outer Air Seal (BOAS) position that defines a first air volume and a radially expanded Blade Outer Air Seal (BOAS) position that defines a second air volume, the second air volume different than the first air volume. An accumulator system accommodate a difference in air volume between the first air volume and the second air volume.

20 Claims, 7 Drawing Sheets

(52) U.S. Cl.
CPC ...... *F05D 2240/55* (2013.01); *F05D 2260/42* (2013.01); *F05D 2270/60* (2013.01)

(58) Field of Classification Search
USPC .......................................................... 415/1
See application file for complete search history.

(56) References Cited

U.S. PATENT DOCUMENTS

| | | | |
|---|---|---|---|
| 5,056,988 A * | 10/1991 | Corsmeier | F01D 11/22 415/126 |
| 5,090,194 A | 2/1992 | Richards et al. | |
| 5,203,673 A * | 4/1993 | Evans | F01D 11/22 415/10 |
| 5,601,402 A * | 2/1997 | Wakeman | F01D 11/22 415/173.1 |
| 5,871,333 A | 2/1999 | Halsey | |
| 7,596,954 B2 * | 10/2009 | Penda | F01D 11/16 415/173.2 |
| 2003/0215323 A1 | 11/2003 | Prinz et al. | |
| 2006/0005529 A1 | 1/2006 | Penda et al. | |
| 2010/0003125 A1 | 1/2010 | Smith | |
| 2010/0247297 A1 | 9/2010 | Legare et al. | |
| 2011/0293407 A1 | 12/2011 | Wagner | |

* cited by examiner

GAS TURBINE ENGINE RAPID RESPONSE CLEARANCE CONTROL SYSTEM WITH VARIABLE VOLUME TURBINE CASE

This application claims priority to PCT Patent Application No. PCT/US14/15080 filed Feb. 6, 2014, which claims priority to U.S. Patent Appln. No. 61/811,506 filed Apr. 12, 2013.

STATEMENT REGARDING FEDERALLY SPONSORED RESEARCH OR DEVELOPMENT

This disclosure was made with Government support under FA8650-09-D-2923 0021 awarded by The United States Air Force. The Government has certain rights in this disclosure.

BACKGROUND

The present disclosure relates to a gas turbine engine and, more particularly, to a blade tip rapid response active clearance control (RRACC) system therefor.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases. The compressor and turbine sections include rotatable blade and stationary vane arrays. Within an engine case structure, the radial outermost tips of each blade array are positioned in close proximity to a shroud assembly. Blade Outer Air Seals (BOAS) supported by the shroud assembly are located adjacent to the blade tips such that a radial tip clearance is defined therebetween.

When in operation, the thermal environment in the engine varies and may cause thermal expansion and contraction such that the radial tip clearance varies. The radial tip clearance is typically designed so that the blade tips do not rub against the Blade Outer Air Seal (BOAS) under high power operations when the blade disk and blades expand as a result of thermal expansion and centrifugal loads. When engine power is reduced, the radial tip clearance increases. To facilitate engine performance, it is operationally advantageous to maintain a close radial tip clearance through the various engine operational conditions.

SUMMARY

An active clearance control system of a gas turbine engine according to one disclosed non-limiting embodiment of the present disclosure includes a radially adjustable blade outer air seal system movable between a radially contracted Blade Outer Air Seal position that defines a first air volume and a radially expanded Blade Outer Air Seal position that defines a second air volume, the second air volume different than the first air volume and an accumulator system that accommodate a difference in air volume between the first air volume and the second air volume.

A further embodiment of the present disclosure includes, wherein the accumulator system is operable to maintain a constant volume between a multiple of air seal segments of the radially adjustable blade outer air seal system and an engine case structure.

A further embodiment of any of the foregoing embodiments of the present disclosure includes, wherein the accumulator system is passively operable.

A further embodiment of any of the foregoing embodiments of the present disclosure includes, wherein the accumulator system includes a piston.

A further embodiment of any of the foregoing embodiments of the present disclosure includes, wherein the piston is biased.

A further embodiment of any of the foregoing embodiments of the present disclosure includes, wherein the piston is movable to maintain a constant volume between a multiple of air seal segments of the radially adjustable blade outer air seal system and an engine case structure.

A further embodiment of any of the foregoing embodiments of the present disclosure includes, wherein the piston is momentarily displaced from a home position to maintain a constant volume between a multiple of air seal segments of the radially adjustable blade outer air seal system and an engine case structure.

A further embodiment of any of the foregoing embodiments of the present disclosure includes a biasing member to return the piston to the home position.

A further embodiment of any of the foregoing embodiments of the present disclosure includes an orifice in the piston to control a return of the piston to the home position.

A further embodiment of any of the foregoing embodiments of the present disclosure includes, wherein the accumulator system includes a pneumatic cylinder located internal to an engine case structure.

A further embodiment of any of the foregoing embodiments of the present disclosure includes, wherein the accumulator system includes a pneumatic cylinder located external to an engine case structure.

A further embodiment of any of the foregoing embodiments of the present disclosure includes, wherein the accumulator system includes a pneumatic cylinder located external to an engine case structure.

A further embodiment of any of the foregoing embodiments of the present disclosure includes, wherein the accumulator system includes a pneumatic cylinder that is at least partially annular.

A method of active blade tip clearance control for a gas turbine engine, according to another disclosed non-limiting embodiment of the present disclosure includes maintaining a constant volume between a multiple of air seal segments of a radially adjustable blade outer air seal system and an engine case structure.

A further embodiment of any of the foregoing embodiments of the present disclosure includes maintaining the constant volume with an accumulator system.

A further embodiment of any of the foregoing embodiments of the present disclosure includes maintaining the constant volume with by moving a piston within a pneumatic cylinder.

A further embodiment of any of the foregoing embodiments of the present disclosure includes momentarily displacing the piston within the pneumatic cylinder then returning the piston to a home position.

A further embodiment of any of the foregoing embodiments of the present disclosure includes returning the piston to the home position with a biasing member.

A further embodiment of any of the foregoing embodiments of the present disclosure includes locating the accumulator system within an engine case structure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
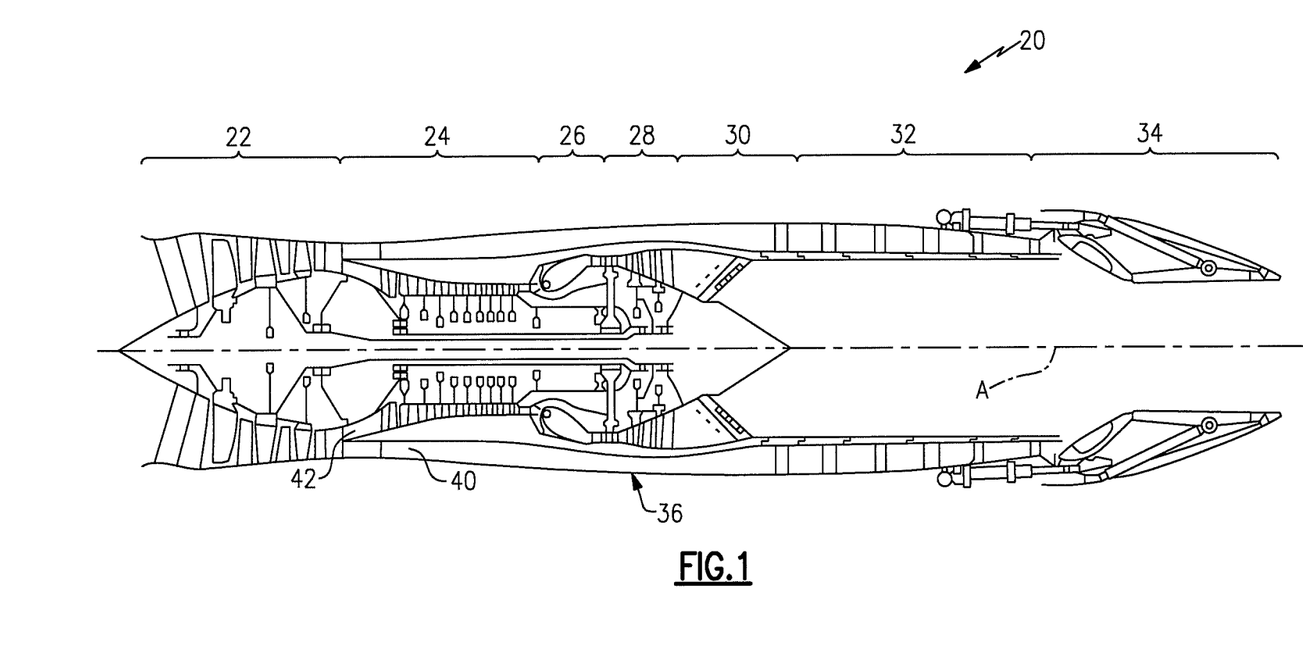
FIG. 1 is a schematic cross-section of one example aero gas turbine engine.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

An engine case structure 36 defines a generally annular secondary airflow path 40 around a core airflow path 42. Various case structures and modules may define the engine case structure 36 that essentially defines an exoskeleton to support the rotational hardware.

Air that enters the fan section 22 is divided between a core airflow through the core airflow path 42 and a secondary airflow through a secondary airflow path 40. The core airflow passes through the combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein may be any airflow different from the core airflow. The secondary airflow may ultimately be at least partially injected into the core airflow path 42 adjacent to the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 may terminate in a Convergent/Divergent (C/D) nozzle system, a non-axisymmetric two-dimensional (2D) C/D vectorable nozzle system, a flattened slot nozzle of high aspect ratio or other nozzle arrangement.

Figure 2:
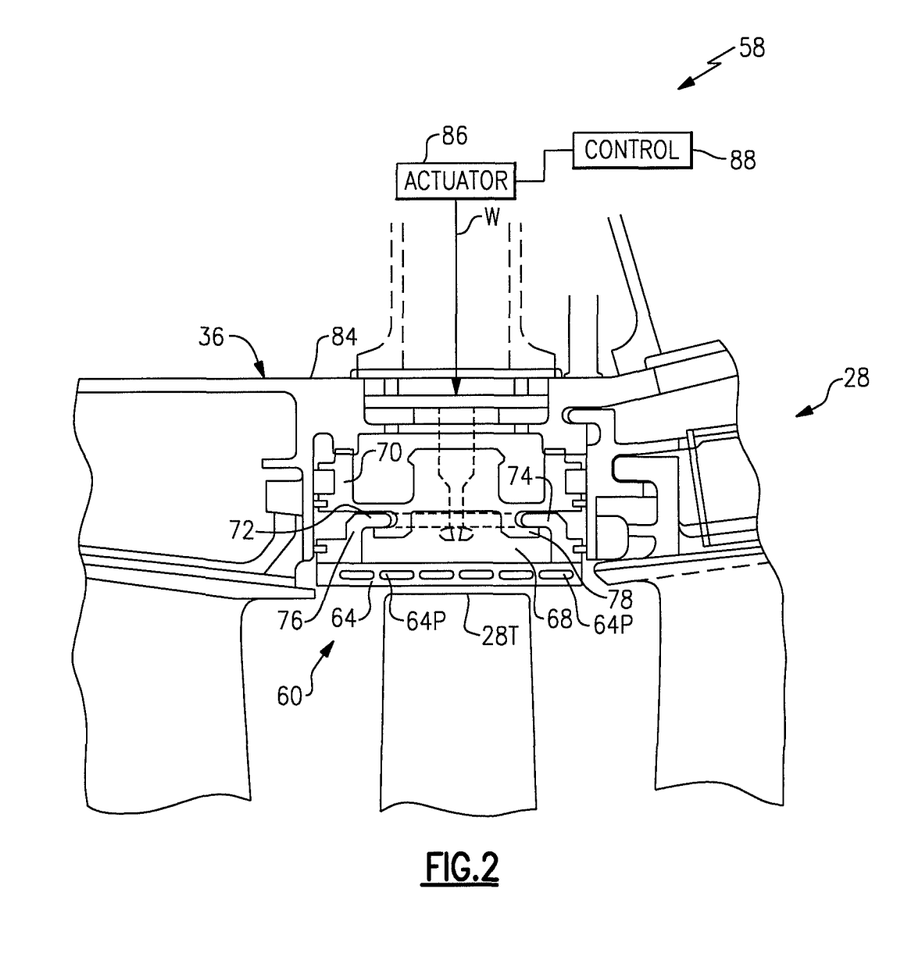
FIG. 2 is an is an enlarged partial sectional schematic view of a portion of a rapid response active clearance control system according to one disclosed non-limiting embodiment.

With reference to FIG. 2, a blade tip rapid response active clearance control (RRACC) system 58 includes a radially adjustable Blade Outer Air Seal System (BOAS) 60 that operates to control blade tip clearances inside for example, the turbine section 28, however, other sections such as the compressor section 24 may also benefit herefrom. The radially adjustable Blade Outer Air Seal System (BOAS) 60 may be arranged around each or particular stages within the gas turbine engine 20. That is, each rotor stage may have an associated radially adjustable Blade Outer Air Seal System (BOAS) 60 of the blade tip rapid response active clearance control system 58.

Each radially adjustable Blade Outer Air Seal System (BOAS) 60 is subdivided into a multiple of circumferential segments 62, each with a respective air seal segment 64 and a puller 68 (illustrated schematically). In one disclosed non-limiting embodiment, each circumferential segment 62 may extend circumferentially for about nine (9) degrees. It should be appreciated that any number of circumferential segments 62 and various other components may alternatively or additionally be provided.

Each of the multiple of air seal segments 64 is at least partially supported by a generally fixed full-hoop thermal control ring 70. That is, the full-hoop thermal control ring 70 is mounted to, or forms a portion of, the engine case structure 36 to thermally expand and contract and at least partially control blade tip clearances in a passive manner. It should be appreciated that various static structures may additionally or alternatively be provided to at least partially support the multiple of air seal segments 64 yet permit relative radial movement therebetween.

Each air seal segment 64 may be manufactured of an abradable material to accommodate potential interaction with the rotating blade tips 28T within the turbine section 28 and includes numerous cooling air passages 64P to permit secondary airflow therethrough.

Figure 3:
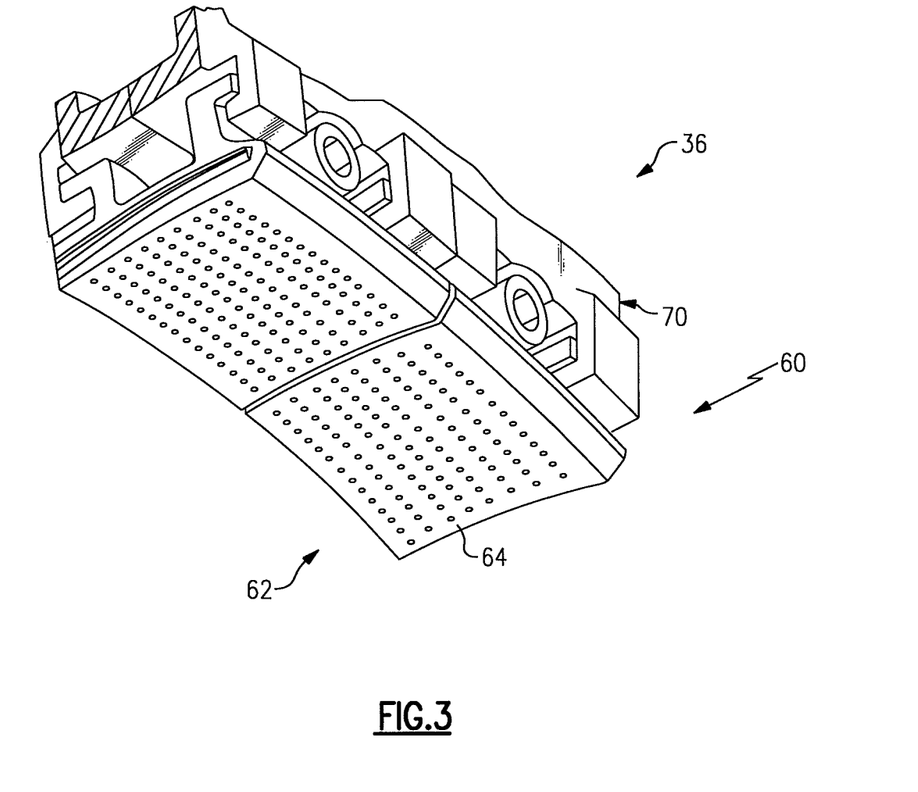
FIG. 3 is an enlarged perspective view of a circumferential portion of the rapid response active clearance control system with two air seal segments.

A radially extending forward hook 72 and an aft hook 74 of each air seal segment 64 respectively cooperates with a forward hook 76 and an aft hook 78 of the full-hoop thermal control ring 70. The forward hook 76 and the aft hook 78 of the full-hoop thermal control ring 70 may be segmented (FIG. 3) or otherwise configured for assembly of the respective air seal segment 64 thereto. The forward hook 72 may extend axially aft and the aft hook 74 may extend axially forward (shown); vice-versa or both may extend axially forward or aft within the engine to engage the reciprocally directed forward hook 76 and aft hook 78 of the full-hoop thermal control ring 70.

Figure 4:
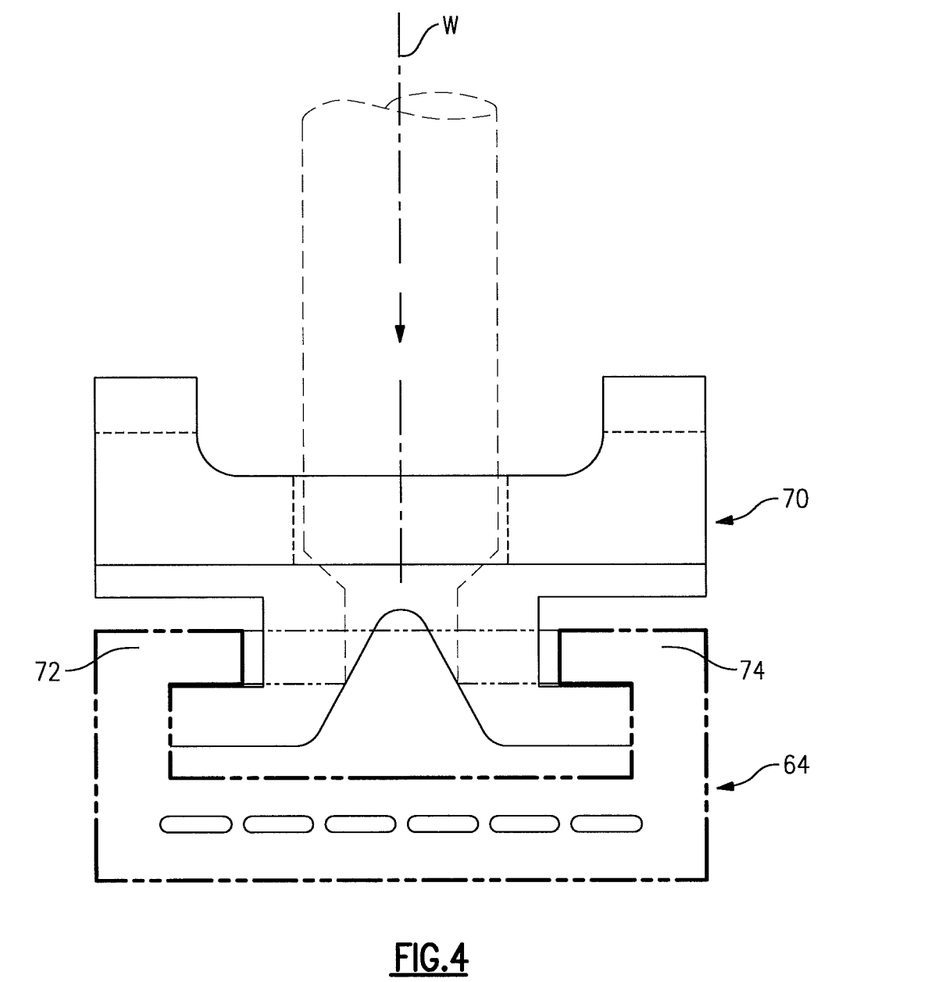
FIG. 4 is an enlarged partial sectional schematic view of one of a multiple of air seal segments with the rapid response active clearance control system in an extended radially contracted BOAS position.

With continued reference to FIG. 2, each air seal segment 64 is radially positioned between an extended radially contracted Blade Outer Air Seal (BOAS) position (FIG. 4) and a retracted radially expanded Blade Outer Air Seal (BOAS) position (FIG. 5) with respect to the full-hoop thermal control ring 70 by the puller 68. The puller 68 need only "pull" each associated air seal segment 64 as a differential pressure from the core airflow biases the air seal segment 64 toward the extended radially contracted Blade Outer Air Seal (BOAS) position (FIG. 4). For example, the differential pressure may exert an about 1000 pound force (4448 newtons) inward force on each air seal segment 64.

Figure 5:
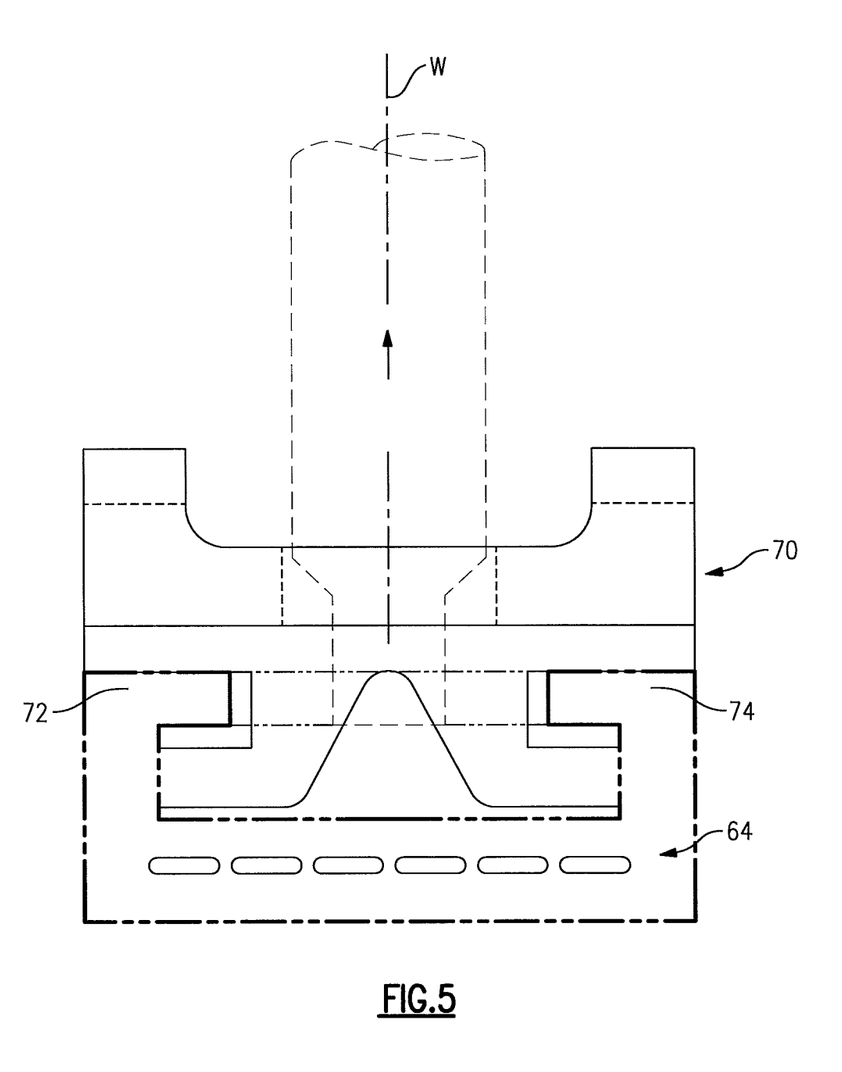
FIG. 5 is an enlarged partial sectional schematic view of one of a multiple of air seal segments with the rapid response active clearance control system in a retracted radially expanded BOAS position.

The puller 68 from each associated air seal segment 64 may extend from, or be a portion of, an actuator 86 (illustrated schematically) that operates in response to a control 88 (illustrated schematically) to adjust the radially adjustable Blade Outer Air Seal (BOAS) system 60 between the extended radially contracted Blade Outer Air Seal (BOAS) position (FIG. 4) and the retracted radially expanded Blade Outer Air Seal (BOAS) position (FIG. 5). It should be appreciated that various other control components such as sensors, actuators and other subsystems may be utilized herewith.

The actuator 86 may include a mechanical, electrical and/or pneumatic drive that operates to move the respective air seal segment 64 along an axis W so as to contract and expand the radially adjustable Blade Outer Air Seal System (BOAS) 60. That is, the actuator 86 provides the motive force to pull the puller 68.

The control 88 generally includes a control module that executes radial tip clearance control logic to thereby control the radial tip clearance relative the rotating blade tips. The control module typically includes a processor, a memory, and an interface. The processor may be any type of known microprocessor having desired performance characteristics. The memory may be any computer readable medium which stores data and control algorithms such as logic as described herein. The interface facilitates communication with other components such as a thermocouple, and the actuator 86. In one non-limiting embodiment, the control module may be a portion of a flight control computer, a portion of a Full Authority Digital Engine Control (FADEC), a stand-alone unit or other system.

When the radially adjustable Blade Outer Air Seal System (BOAS) 60 is pulled from the radially expanded Blade Outer Air Seal (BOAS) position (FIG. 3) to the radially contracted Blade Outer Air Seal (BOAS) position (FIG. 4) an increased pressure loading is formed on the back side of the multiple of air seal segments 64 which operates against the actuator 86. In other words, an increased pressure occurs between the multiple of air seal segments 64 and the engine case structure 36.

Figure 6:
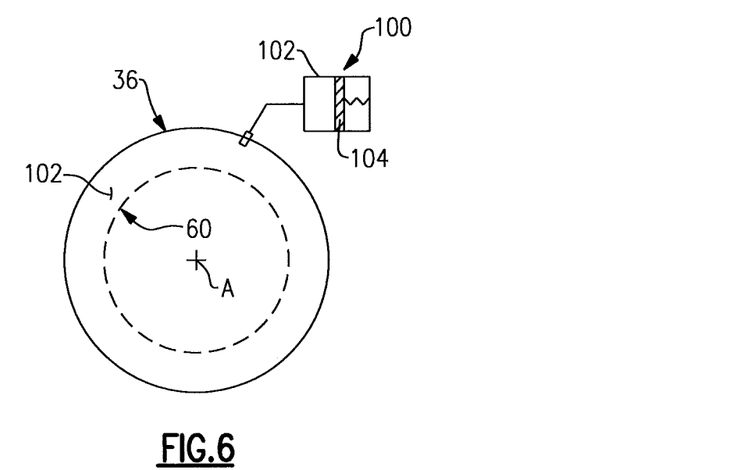
FIG. 6 is a sectional schematic view of the blade tip rapid response active clearance control (RRACC) system extended to provide a radially contracted BOAS position shown in FIG. 4.

With reference to FIG. 6, to accommodate the increased pressure, an accumulator system 100 is in communication with an air volume 102 in the generally annular space between the multiple of air seal segments 64 and the engine case structure 36. The air volume 102 may be of a particular stage or multiple stages within the gas turbine engine 20.

Figure 7:
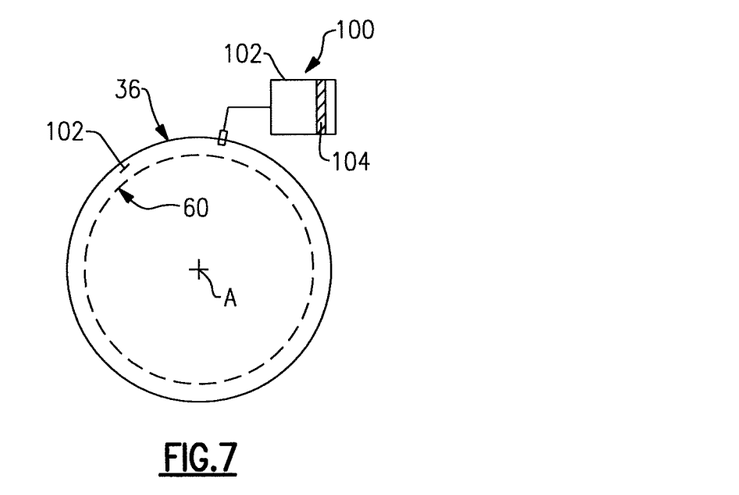
FIG. 7 is a sectional schematic view of the blade tip rapid response active clearance control (RRACC) system retracted to provide a radially expanded BOAS position shown in FIG. 5.

In one disclosed non-liming embodiment, the accumulator system 100 may be a pneumatic cylinder 102 with a movable piston 104 which is moved to accommodate the air volume 102 when the radially adjustable Blade Outer Air Seal System (BOAS) 60 is pulled from the radially expanded Blade Outer Air Seal (BOAS) position (FIG. 7) to the radially contracted Blade Outer Air Seal (BOAS) position (FIG. 7). That is, the piston 104 is passively operable.

The pneumatic cylinder 102 may be located internal (FIG. 8) or external (FIG. 9) with respect to the engine case structure 36. Further, in one disclosed non-limiting embodiment, the pneumatic cylinder may be annular (FIG. 10) to facilitate packaging within the engine case structure 36 (FIG. 6).

Figure 8:
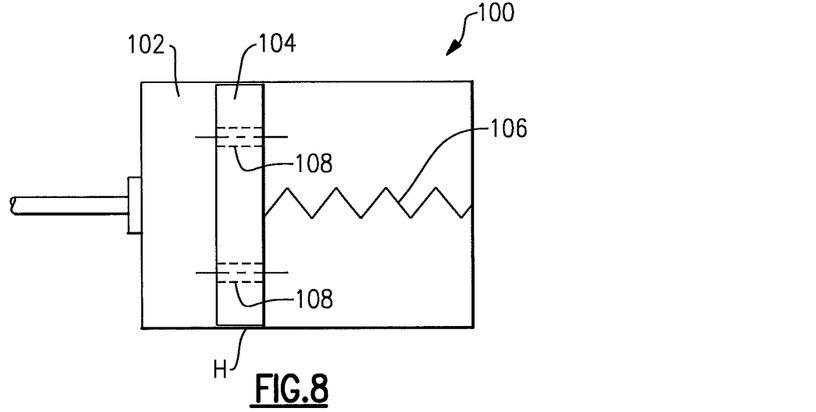
FIG. 8 is schematic view of an accumulator system according to one disclosed non-limiting embodiment.

As the radially adjustable Blade Outer Air Seal System (BOAS) 60 is actuated, the piston 104 is moved to maintain a constant volume between the multiple of air seal segments 64 and the engine case structure 36. In one disclosed non-limiting embodiment, the piston 104 is a momentarily displacement piston that includes a bias member 106 such as a spring and one or more orifice 108 therethrough (FIG. 8). The piston 104 is only displaced momentarily and returns to a home position by the bias member 106. The movement of the piston 104 is controlled by the orifice 108 which allows the air to bleed from one side of the piston 104 to another. The accumulator system 100 may be more efficient than dampening each of the multiple of air seal segments 64 individually.

Figures 9, 10:
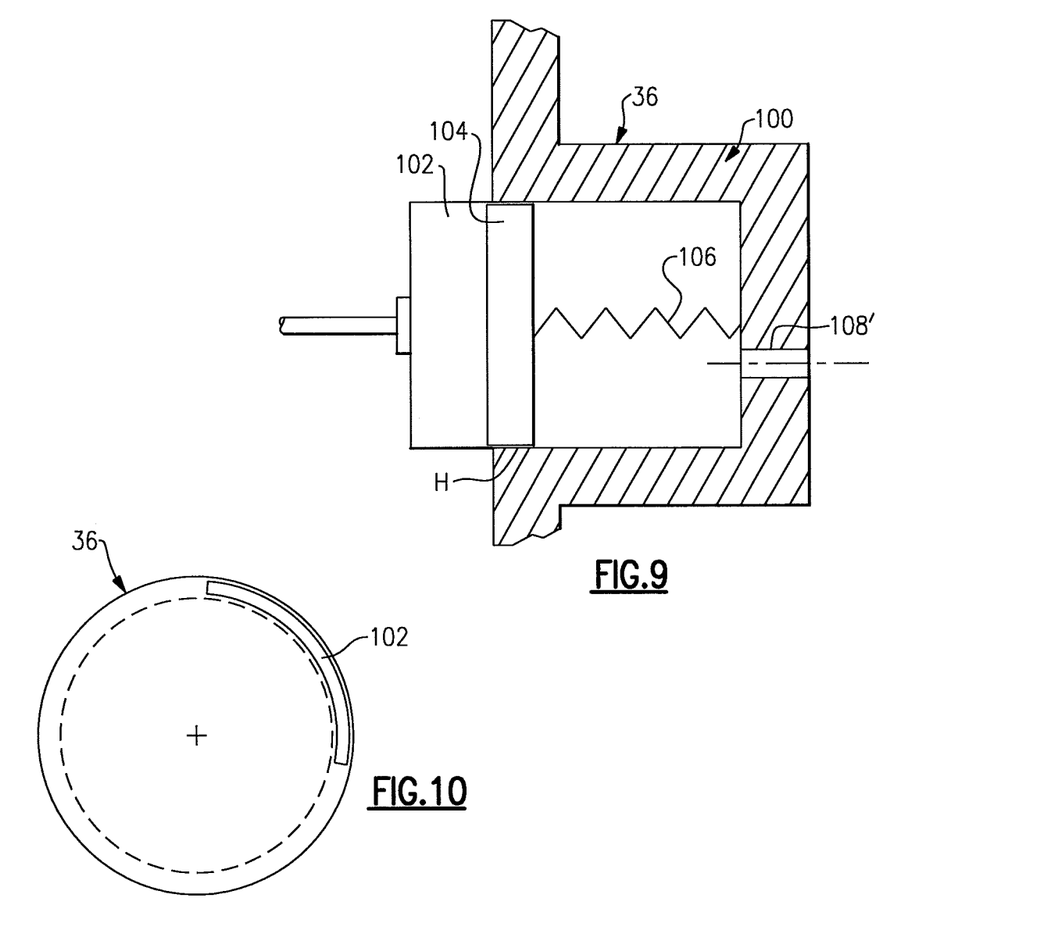
FIG. 9 is schematic view of an accumulator system according to another disclosed non-limiting embodiment.
FIG. 10 is schematic view of an a partially arcuate accumulator system within an engine case structure according to yet another disclosed non-limiting embodiment.

With reference to FIG. 9, a backside of the piston 104 vents to atmosphere through an orifice 108' in the engine case structure 36 when the system actuated. That is, the piston 104 is controlled by the orifice 108' which allows the air on the bias member 106 side to vent directly through the engine case structure 36.

The reduced air pressure load on the radially adjustable Blade Outer Air Seal System (BOAS) 60 provided by the accumulator system 100 facilitates the use of a relatively smaller actuator 86.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An active clearance control system of a gas turbine engine comprising:
a radially adjustable blade outer air seal system disposed radially inside of an engine case of the gas turbine engine, the radially adjustable blade outer air seal system defining an annular space between the radially adjustable blade outer air seal system and the engine case, the radially adjustable blade outer air seal system movable between a radially contracted Blade Outer Air Seal position that defines a first air volume of the annular space and a radially expanded Blade Outer Air Seal position that defines a second air volume of the annular space, the second air volume different than the first air volume;
an actuator in communication with the radially adjustable blade outer air seal system and configured to move the radially adjustable blade outer air seal system between the radially contracted Blade Outer Air Seal position and the radially expanded Blade Outer Air Seal position; and
an accumulator system comprising a pneumatic cylinder and a piston disposed within the pneumatic cylinder, the piston in fluid communication with the annular space and movable between a first position corresponding to the first air volume and a second position corresponding to the second air volume;
wherein the accumulator system accommodates a difference in air volume between the first air volume and the second air volume.

2. The system as recited in claim 1, wherein the accumulator system is operable to maintain a constant air volume within the annular space.

3. The system as recited in claim 1, wherein a change in air volume of the annular space from the first air volume to the second air volume moves the piston from the first position to the second position.

4. The system as recited in claim 3, wherein the piston and the pneumatic cylinder define a first cavity on a first side of the piston and a second cavity on a second side of the piston.

5. The system as recited in claim 4, wherein the accumulator system includes a biasing member connecting the pneumatic cylinder and the second side of the piston.

6. The system as recited in claim 3, wherein the piston is movable to maintain a constant air volume within the annular space.

7. The system as recited in claim 5, wherein the piston is momentarily displaced from a home position, corresponding to the first position, to the second position to maintain a constant air volume within the annular space.

8. The system as recited in claim 7, wherein the biasing member is configured to return the piston to the home position without a corresponding change in the air volume of the annular space.

9. The system as recited in claim 8, wherein the accumulator system further comprises at least one orifice extending from the first chamber to the second chamber through the piston.

10. The system as recited in claim 1, wherein the pneumatic cylinder is located internal to the engine case.

11. The system as recited in claim 1, wherein the pneumatic cylinder is located external to the engine case.

12. The system as recited in claim 1, wherein the pneumatic cylinder is at least partially annular with respect to an axial centerline of the engine case.

13. A method of active blade tip clearance control for a gas turbine engine, comprising:
moving an air seal segment of a radially adjustable blade outer air seal system with an actuator, wherein the actuator moves the air seal segment radially between a first position defining a first air volume of an annular space, defined between the radially adjustable blade outer air seal system and an engine case, and a second position defining a second air volume of the annular space, the second air volume different than the first air volume;
accommodating a difference in air volume between the first air volume and the second air volume with an accumulator system comprising a pneumatic cylinder and a piston disposed within the pneumatic cylinder, the piston in fluid communication with the annular space and movable between a first position corresponding to the first air volume and a second position corresponding to the second air volume; and
maintaining a constant air volume within the annular space with the accumulator system.

14. The method as recited in claim 13, wherein the accumulator system maintains the constant volume by moving the piston within the pneumatic cylinder from the first position to the second position.

15. The method as recited in claim 14, further comprising momentarily displacing the piston within the pneumatic cylinder from the first position to the second position and then returning the piston to a home position corresponding to the first position.

16. The method as recited in claim 15, further comprising returning the piston to the home position with a biasing member connecting the piston to the pneumatic cylinder.

17. The method as recited in claim 13, wherein the accumulator system is located within said engine case structure.

18. The system as recited in claim 8, wherein the accumulator system further comprises an orifice extending from an exterior of the pneumatic cylinder to the second chamber through the pneumatic cylinder.

19. The system as recited in claim 5, wherein the biasing member is a spring.

20. The system as recited in claim 12, wherein the pneumatic cylinder is disposed within the annular space.

* * * * *